United States Patent [19]

Boyce, Jr. et al.

[11] Patent Number: 4,465,411
[45] Date of Patent: Aug. 14, 1984

[54] GEAR SHAPING TOOL RECONSTRUCTION

[76] Inventors: Clarence A. Boyce, Jr., Rte.3, Dr. 15, WS 387, Nineveh, Ind. 46164; Harold E. Voetsch, 5905 Kilmer La., Indianapolis, Ind. 46250

[21] Appl. No.: 372,959

[22] Filed: Apr. 29, 1982

[51] Int. Cl.³ .................. B26D 1/12; B21K 1/30; B21D 53/28
[52] U.S. Cl. .................. 407/28; 76/101 A; 29/402.08; 29/159.2; 228/119; 228/139; 228/171
[58] Field of Search .................. 76/101 R, 101 A; 29/402.01, 402.03, 402.04, 402.06, 402.07, 402.08, 402.09, 402.11, 402.12, 402.13, 402.14, 402.16, 159.2; 228/119, 139, 170, 171; 407/28

[56] References Cited

U.S. PATENT DOCUMENTS

| | | | |
|---|---|---|---|
| 1,403,011 | 1/1922 | Cogsdill | 76/101 A |
| 1,508,800 | 9/1924 | Mattice | 29/159.2 |
| 1,804,837 | 5/1931 | Lunn | 228/119 |
| 3,227,008 | 1/1966 | Celovsky | 76/101 R |
| 3,972,106 | 8/1976 | Orr | 29/402.12 |

OTHER PUBLICATIONS

American Machinist, Jan. 1, 1931, *Repairing Gears Having Broken Teeth*, T. Smith, vol. 74, p. 23.

Primary Examiner—Roscoe V. Parker
Attorney, Agent, or Firm—Woodard, Weikart, Emhardt & Naughton

[57] ABSTRACT

A gear shaper or shaver cutter which has broken or damaged teeth is salvaged by removing good teeth from an identical cutter which is otherwise unsalvagable. The removal of damaged teeth from the salvagable cutter, and removal of good teeth from the unsalvagable cutter, is done by electrical discharge machining (EDM) wire. The good teeth are removed as an integral group which is snugly fitted into and plugs the slot where the damaged teeth were removed from the salvageable cutter. The group is locked in place by a lock pin in an aperture made by EDM electrode procedure, the lock pin being welded in place by electron beam welding, and or any other suitable state of the art.

21 Claims, 15 Drawing Figures

GEAR SHAPING TOOL RECONSTRUCTION

BACKGROUND OF THE INVENTION

1. Field of the Invention

This invention relates generally to cutters for machine tools, and more particularly to reconstruction of gear shaping and shaving cutters.

2. Description of the Prior Art

One method of cutting teeth to make a gear is by installing a suitable blank in a gear shaping machine. One brand of such machines is Fellows. A Fellows gear shaper has a cutter which looks similar to a gear and rotates slowly as it reciprocates against a metal blank which also rotates slowly, whereby the cutter cuts teeth on the blank. For some gears, where additional quality of finish and dimension is needed, a shaving cutter can be installed in a machine to shave the teeth previously produced by a gear cutter.

It happens too frequently that one or more teeth or tooth portions of a cutter are damaged or broken out completely from the cutter. Efforts have been made to replace such teeth but, because of the impact of the cutting action, and the precision required, results heretofore have been unsatisfactory, particularly with gear cutters. The result is that, when damaged, the practice has been to discard them. A new gear cutter can cost $400 or more, depending on size, so the prospect of discarding a cutter with one or more broken teeth, is not a bright one, particularly if it is a relatively new cutter.

It is an object of the present invention to salvage broken gear shaping tools and provide a method of doing so at a reasonable cost for a precision reliable salvaged cutter.

SUMMARY OF THE INVENTION

Described briefly, according to a typical embodiment of the present invention, the damaged and broken teeth of a cutter to be salvaged (hereafter referred to as the "salvage cutter") are removed by electrical discharge machining (EDM). Another cutter, which is unsuitable for salvage (and therefore may be referred to as "expendable") but which has some good teeth on it, is used for replacement teeth. A tooth or group of teeth and adjacent material serving as a tooth base are removed from the expendable cutter by the EDM process. The cutouts on the salvage cutter and the expendable cutter are made essentially identical, so the replacement teeth and base will fit precisely as a plug in the cavity in the salvage cutter from which the broken teeth have been removed. A lock pin receiving aperture is made in mating faces of the salvage cutter and replacement tooth base. A lock pin is installed and welded to the salvage cutter and replacement plug by electron beam welding (EBW), and or any other suitable state of the art, fusion or bonding technique.

DESCRIPTION OF THE PREFERRED EMBODIMENT

Figure 1:
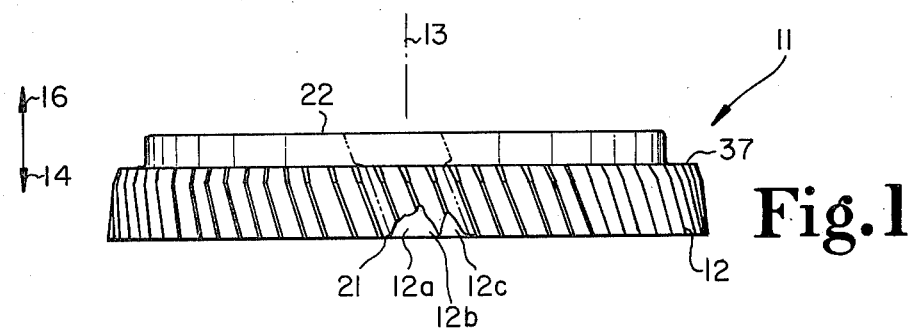
FIG. 1 is a side elevational view of a gear cutter having three broken teeth.

Referring now to the drawings in detail, the cutter 11 has a plurality of cutter teeth 12 equally spaced on the peripheral surface having a central axis 13. When mounted in a gear shaping machine, the cutter reciprocates in the direction of arrows 14 and 16 parallel to the central axis 13 of the cutter. There is a limited amount of oscillation about the axis 13 of both the cutter and the workpiece when cutting helical gears. The cutting occurs on the downstroke 14. Three of the teeth have had the cutting edges broken off as shown at 12a, 12b and 12c. This can occur as a result of any of a variety of causes. Examples are striking a fixture instead of the workpiece, striking an imperfection such as an extra hard place in the workpiece, striking some other obstacle, or dropping the cutter.

Figure 2:
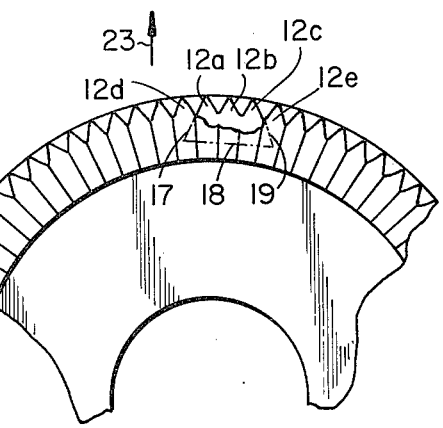
FIG. 2 is a fragmentary bottom plan view of the cutter.
Figure 3:
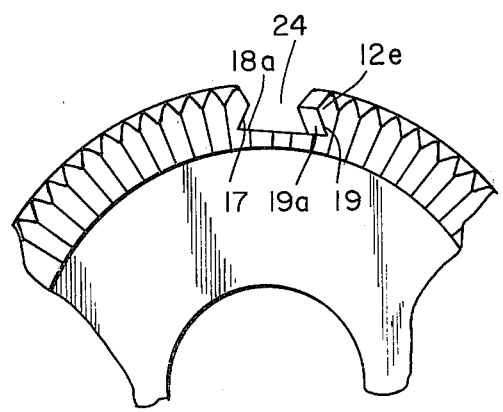
FIG. 3 is a bottom view of the cutter with the teeth removed according to one step in the present invention.
Figure 4:
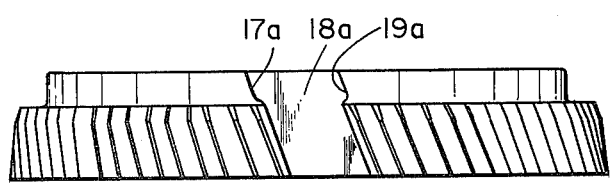
FIG. 4 is a side elevational view of the cutter with the teeth removed.
Figure 5:
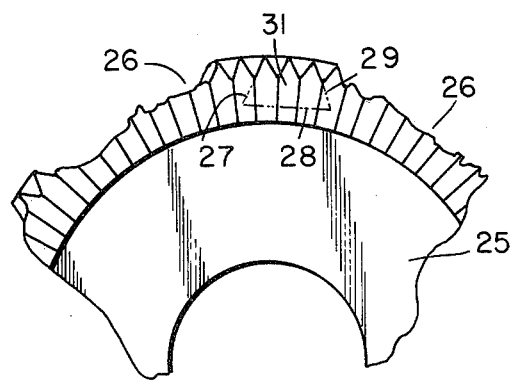
FIG. 5 is a bottom plan view of a fragment of a cutter from which enough teeth are broken out or which is otherwise damaged to an extent that it is beyond salvage, but which has some good teeth useful in salvage of the cutter of FIG. 1.
Figure 6:
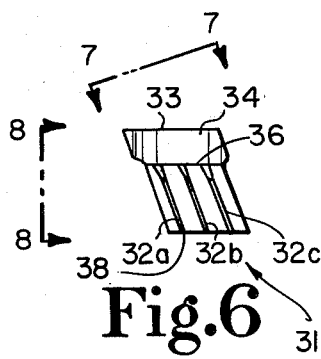
FIG. 6 is a side elevational view of three good teeth cut out of the cutter of FIG. 5.
Figure 7:
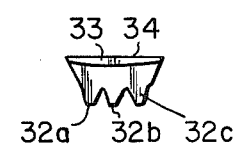
FIG. 7 is a top view taken at line 7—7 in FIG. 6 and viewed in the direction of the arrows.
Figure 8:
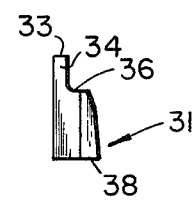
FIG. 8 is a side view of the replacement teeth insert taken at line 8—8 in FIG. 6 and viewed in the direction of the arrows.
Figure 9:
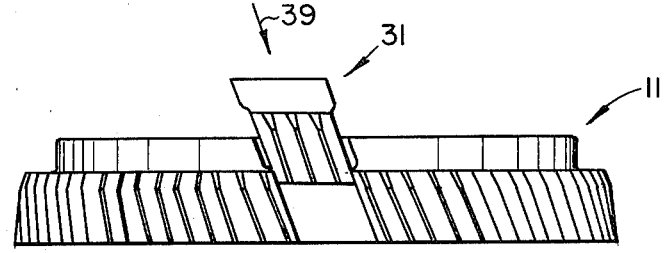
FIG. 9 is a side view of the cutter of FIG. 1 with the insert being installed.

According to a typical embodiment of the present invention, the area encompassing the damaged teeth is identified. In the present example, it is only three teeth. Therefore, these teeth having the damage at 12a, 12b and 12c, are removed, together with a portion of the tooth base. This is done by making a cut along the lines 17, 18, 19 as best shown in FIGS. 2, 3 and 4. The portions 17 and 19 undercut adjacent good teeth 12d and 12e to a limited extent. The amount of undercut is sufficient to prevent the tooth group 12a, 12b, 12c from being pulled out radially with respect to the axis 13 as in the direction of arrow 23 (FIG. 2), but insufficient to weaken the support for teeth 12d and 12e. The cut along lines 17, 18 and 19 from the bottom of the cutter to the top of the cutter is made by electrical discharge machining (EDM) wire. When the cut has been made, the damaged tooth group can be removed in a generally axial direction but parallel to the angle of the helix. The result is a notch or slot 24 in the periphery of the cutter as shown in FIG. 3. The line 19 defines one edge of a flat face 19a parallel to the helix and at the root of the cutter tooth 12e. A similar face is produced from the line 17. Likewise, a flat axially extending face 18a is produced at line 18. This face is parallel to the axis 13 and perpendicular to a radius from the axis to the center of the cutout. The slot thus produced has a dovetail cross sectional shape, or could have another suitable geometrical cross sectional shape.

Next, an expendable cutter 25 is selected for providing replacement teeth. This cutter is referred to as expendable because it is so badly damaged that it cannot be salvaged. Except for the use made of it according to the present invention, it would be discarded. In this example, it has two areas 26 where teeth are broken completely out of it. There is a sector between these areas where there are some good teeth. According to the present invention, a portion of that sector is used to provide a replacement tooth group for installation in the cutter 11. For this purpose, a cut is made along the lines 27, 28 and 29 in cutter 25 in the same manner as described above with reference to FIGS. 1 and 2. A difference exists in the respect that this cut is of a size such that the tooth group removed from this expendable cutter will precisely fit the cavity, notch or slot left in the salvage cutter when the damaged tooth group was removed from it. Accordingly, the tooth group 31 is removed from the expendable cutter. This replacement tooth group has three teeth thereon, 32a, 32b, and 32c. The distance from the top 33 of flange 34 thereof to the top 36 of the teeth is the same as the distance between the top 22 of the salvage cutter and the top 37 of the teeth in the salvage cutter. The distance from top 33 to the bottom 38 of the teeth might be greater or less than the corresponding distance on the salvage cutter, depending on whether the salvage cutter has been sharpened more or less often than the expendable cutter.

Figure 10:
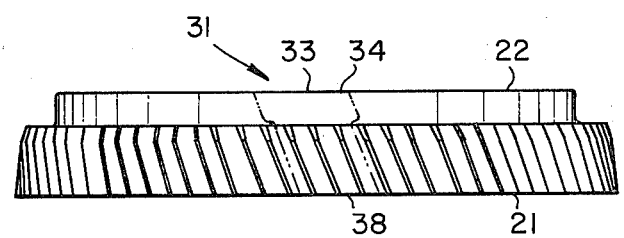
FIG. 10 is a side view of the cutter with the insert installed.
Figure 11:
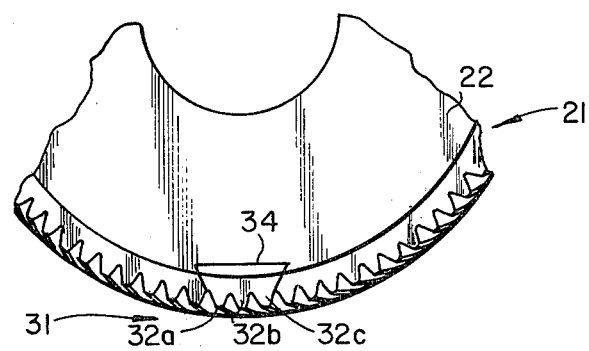
FIG. 11 is a top plan view of the cutter with the insert installed.

The replacement tooth group 31 is installed in the slot 24 of the salvage cutter by pushing it downward in the direction of arrow 39 until the upper faces are flush as shown in FIG. 10. Thus it plugs the slot, and may hereafter be referred to as an insert or plug. If the salvage cutter and expendable cutter had the same amount of sharpening, not only the upper edge 33 of the plug will be flush with the upper face 22 of the cutter, but also the lower edges of the plug teeth at 38 will be essentially flush with the lower edges 21 of the adjacent teeth of the cutter. When viewed from above, the plug will appear as shown in FIG. 11.

Figure 12:
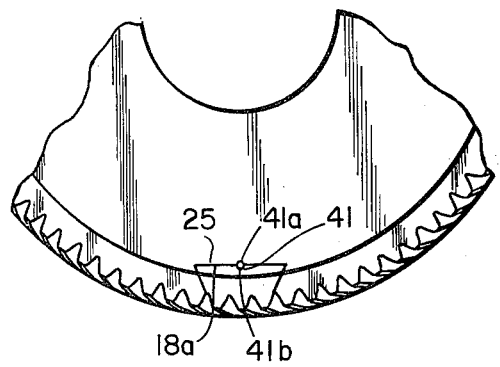
FIG. 12 is a top plan view of the assembly of FIG. 11 but with a dowel pin hole EDM machined therein.

Referring now to FIG. 12, with the replacement tooth plug inserted in the slot in the salvage cutter, the assembly is again placed in an EDM machine. A lock pin hole 41 is made in the assembly at the junction of faces 18a of the cutter and 25 of the insert plug. This hole is made by an electrode of an EDM machine, and it is made entirely through the parts from the top of the assembly to the bottom, on gear shaver cutters. In some instances a blind hole may be employed on a gear shaper cutter. Where the teeth of the gear are helical, this hole is made parallel to the axis of the cutter. If the teeth are straight, as for cutting a spur gear, the hole will be made at an angle with respect to the direction of the axis. For example, it could be made at a helix angle. In any event, the objective is that the hole be transverse to the direction of extension of the cutter teeth, so as to prevent any movement of the plug relative to the cutter in a generally axial direction after installation of a locking pin in the hole 41.

Figure 13:
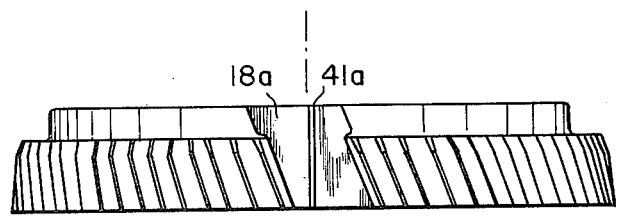
FIG. 13 is an elevational view of the cutter with the replacement teeth removed after the dowel pin hole has been cut.
Figure 14:
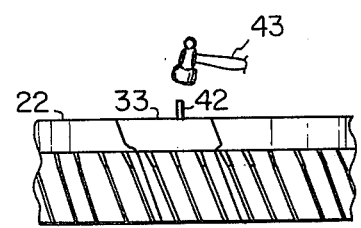
FIG. 14 is a fragmentary side elevational view thereof with the replacement tooth insert in place, and the dowel pin being driven into place.
Figure 15:
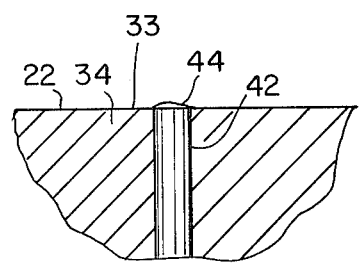
FIG. 15 is a fragmentary sectional view of a fragment of the cutter showing the upper end of the pin and the cutter welded together at the face of the cutter.

In the particular embodiment shown, where the cutter teeth are helical, the portion of the hole which is made in the cutter is shown in FIG. 13 at 41a, the plug having been removed from the assembly to illustrate this. An identical half-cylindrical groove 41b (FIG. 12) is produced in the plug. It should be understood that the plug is not normally removed from the assembly after the making of the hole 41, but it is only removed for FIG. 13 for purposes of illustration. In this example, since the cutter teeth are at a helix, the hole 41 is parallel to the cutter axis 13. After the hole is made, the lock pin 42 is driven into the hole as by a ball peen hammer 43, for example. When the pin has been installed, the assembly is placed in an electron beam welding (EBW) machine and the pin is EBW welded at its top to the plug and cutter. This is indicated at 44 in FIG. 15. If desired to improve the appearance of the assembly, any extension of the pin or weld above the cutter top 33 can be ground flush with the cutter top. Thereupon, the installation is complete and the salvage has been accomplished. From that point, the only further step needed is to sharpen the cutter. In this way, uniformity can be established between the bottoms of the teeth of both the cutter and the plug around the entire circumference of the salvaged cutter. The amount of sharpening needed after the installation of the new tooth group in the salvage cutter can be minimized if the bottom of the teeth of the plug is slightly lower than the original teeth of the salvage cutter. This would be the case if the expendable cutter is newer and less worn, or sharpened less often, than the salvage cutter. Otherwise, if the teeth of the insert tooth group are shorter, excessive sharpening of the salvage cutter will be needed to obtain the same distance from the top of the cutter to the bottom of the cutter teeth throughout its circumference.

Upon review of the figures, and particularly FIG. 3, it can be seen that the shape of the cut made in the salvage cutter to remove the broken teeth from it, is such as to provide undercuts under the teeth at 12d and 12e adjacent the damaged portion, these undercuts being along the lines 17 and 19 and extending from the top to the bottom of the cutter. The same kind of cut is made in the expendable cutter. The cuts made in the salvage cutter and expendable cutter along these lines and line 18 and its counterpart in the expendable cutter, are made so that the insert plug will fit precisely in the slot. It is not intended that it be an interference, press, or line-to-line fit, but the dimension should be within 0.0002 inches so that there will be no movement at all of the plug relative to the cutter in any direction other than the direction of insertion of the plug into the cutter. Movement in this latter direction is then prevented by the locking device which, in the illustrated example, is an elongated pin. The locking device, in order to achieve this result, is installed in a direction transverse to the direction of insertion of the plug. As shown by this disclosure, it need not be transverse by 90°, but does need to be transverse. In this way, once installed, it prevents any movement of the plug relative to the cutter in a direction parallel to the direction of insertion of the plug into the cutter, this latter direction being parallel to the direction of extension of the cutter teeth.

Although the present disclosure shows only one locking pin, it is clearly possible to provide additional locking pins, if desired, particularly if a fairly large segment of the cutter is being repaired. Where a locking device is in the form of a pin, a diameter of 0.125 to 0.190 has been found suitable, but other sizes might also be used. The size of the pin with respect to the hole need not be such that a hard press or drive fit is necessary, so long as it is sufficiently snug as to be able to prevent the relative movement of plug and cutter parallel to the direction of extension (longitudinal axis) of the cutter tooth. It is preferable that the material of the pin be low carbon in most instances in order to avoid cracking of the pin or the cutter itself after welding the pin to the plug and cutter. The pin should be of a tough low carbon material compatible and readily beam weldable to the cutter material. Also, the location of the pin needs to be sufficiently removed from the location of the cutter teeth that there will be no detrimental effect on the cutter teeth as a result of the welding. This requirement is satisfied to a large extent by the nature of electron beam welding so a suitable location of the pin is easily accomplished according to the method of the present invention. The weld can be done in a so-called part vacuum. An example would be 200 to 300 micron pressure at the weld site.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A salvaged cutter for a shaping or shaving machine and comprising;
   a plurality of cutter teeth circularly spaced about an axis and formed in one piece of material;
   at least one additional tooth in the circumference of the cutter and having a tooth shape matching the other teeth but supported on a distinct piece of material locked to the first mentioned piece of material, and;
   pin means directly engaging said one piece of material and said distinct piece of material and locking said additional tooth to said one piece of material to thereby lock said additional tooth in the cutter.

2. The cutter of claim 1 wherein:
   said additional tooth is on a plug fittingly received in a cavity in the cutter; and
   said pin means include a locking pin received in the plug and cutter and locks the plug and cutter together.

3. The cutter of claim 2 wherein:
   the plug has a base with a dovetail configuration received in a slot having a dovetail configuration in the periphery of the cutter to prevent relative movement of the plug and cutter in a direction perpendicular to the axis of the cutter.

4. The cutter of claim 3 wherein:
   the longitudinal axis of the pin is in a direction transverse to the direction of extension from one end to the other of the tooth on the plug.

5. The cutter of claim 2 wherein:
   said pin is fusion bonded to at least one of said plug and cutter.

6. The cutter of claim 5 wherein:
   said pin is fusion bonded to both the plug and cutter.

7. The cutter of claim 6 wherein:
   said pin is electron beam welded to both the plug and cutter.

8. A method of salvaging a machining tool comprising the steps of:
   removing a damaged portion from the tool;
   installing, where the damaged portion was removed, a replacement portion having finished cutting edges thereon;
   installing a locking device; and
   securing the locking device to the tool and to the replacement portion.

9. The method of claim 8 wherein:
   said securing is done by fusion bonding which involves metal fusion at a location such as to avoid affecting the metal structure at cutting surfaces of the tool and replacement portion.

10. The method of claim 8 wherein:
    said fusion bonding involves metal fusion without distortion of the tool and without distortion of the replacement portion.

11. The method of claim 10 wherein:
    said fusion bonding is done by electron beam welding, and or any other suitable state of the art, fusion or bonding technique.

12. A method of salvaging a machining tool comprising the steps of:
    removing a damaged portion from the tool;
    installing a replacement portion where the damaged portion was removed;
    installing a locking device;
    securing the locking device to the tool and to the replacement portion;
    making a hole in the combination of the replacement portion and the tool while the replacement portion is in the position where the damaged portion was removed,
    using a pin for the locking device and installing the pin with a snug fit in the tool and replacement portion, so that the pin cannot move in the combination in any direction other than axially of the pin, and then performing the step of fusion bonding the pin.

13. The method of claim 12 wherein the hole making step is performed by electric discharge machining.

14. The method of claim 8 wherein the tool is a salvage gear cutter having cutting teeth thereon circularly spaced around an axis, and wherein the damaged portion included at least one axially extending cutting tooth, and wherein:
    the damaged portion is removed by making a cut which extends from the top to the bottom of the cutter for cutting out the damaged portion from the cutter, the cut having a pattern which provides at least one undercut of a tooth adjacent the damaged portion to prevent separation of the damaged portion from the cutter in a direction radially outward from the axis,
    said replacement portion is obtained by cutting it out of an expendable cutter having cutting teeth which have a profile like that of the cutting tooth on the damaged portion of the salvage cutter, and
    the size of the replacement portion is such that, when installed in the location where the damaged portion was removed, it is immovable in any direction relative to the salvage cutter except in a direction parallel to the direction of extension of a cutter tooth on the replacement portion.

15. The method of claim 14 wherein:
    the cutting of the expendable cutter is in the same pattern as the cut in the salvage cutter.

16. The method of claim 14 wherein the cutting of the expendable cutter and the cutting of the salvage cutter are done by electrical discharge machining.

17. The method of claim 14 wherein:
    said locking device installing step installs said locking device in a direction transverse to the direction of installation of said replacement portion.

18. The method of claim 17 wherein said locking device is elongate and said installing step installs said locking device by moving said device in a direction parallel to its length.

19. The method of claim 14 wherein:
the locking device is installed in a direction transverse to said direction of extension.

20. The method of claim 19 wherein:
said fusion bonding is done by electron beam welding, and or any other suitable state of the art, fusion or bonding technique.

21. The method of claim 20 wherein:
the locking device is an elongate pin and the fusion bonding is performed at one end of the pin.

* * * * *